United States Patent
Katou et al.

(10) Patent No.: US 10,639,799 B2
(45) Date of Patent: May 5, 2020

(54) ROBOT SYSTEM

(71) Applicant: FANUC CORPORATION, Yamanashi (JP)

(72) Inventors: Tomoki Katou, Yamanashi (JP); Tomoyuki Yamamoto, Yamanashi (JP); Takeaki Aramaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/135,753

(22) Filed: Sep. 19, 2018

(65) Prior Publication Data

US 2019/0091873 A1 Mar. 28, 2019

(30) Foreign Application Priority Data

Sep. 25, 2017 (JP) .................. 2017-183130

(51) Int. Cl.
- B25J 13/08 (2006.01)
- B25J 1/02 (2006.01)
- B25J 9/16 (2006.01)
- G01L 5/22 (2006.01)

(52) U.S. Cl.
CPC .............. *B25J 13/085* (2013.01); *B25J 1/02* (2013.01); *B25J 9/1674* (2013.01); *G01L 5/226* (2013.01); *G05B 2219/37357* (2013.01); *G05B 2219/37396* (2013.01); *G05B 2219/40582* (2013.01)

(58) Field of Classification Search
CPC ...................................... B25J 13/085
USPC ............ 318/568.16, 568.11, 568.1, 567, 560
See application file for complete search history.

(56) References Cited

U.S. PATENT DOCUMENTS

| | | | |
|---|---|---|---|
| 4,640,663 A | 2/1987 | Niinomi et al. | |
| 5,363,474 A | 11/1994 | Sarugaku et al. | |
| 7,391,178 B2* | 6/2008 | Tanaka | B25J 9/1676 318/568.2 |
| 9,568,201 B2* | 2/2017 | Fadell | G05D 23/1905 |
| 2009/0030550 A1 | 1/2009 | Nagata et al. | |

(Continued)

FOREIGN PATENT DOCUMENTS

| | | |
|---|---|---|
| CN | 101147104 A | 3/2008 |
| CN | 105034025 A | 11/2015 |

(Continued)

OTHER PUBLICATIONS

Japanese Office Action dated Jul. 2, 2019, for Japanese Patent Application No. 2017-183130.

(Continued)

*Primary Examiner* — David Luo
(74) *Attorney, Agent, or Firm* — Karceski IP Law, PLLC

(57) ABSTRACT

A robot system includes: a robot that is movable according to an external force applied thereto by a worker; a force detecting unit that is provided in the robot and that detects the magnitude of an external force acting on the robot; a warning part that vibrates the robot when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit.

6 Claims, 2 Drawing Sheets

(56) References Cited

U.S. PATENT DOCUMENTS

| | | |
|---|---|---|
| 2014/0067128 A1 | 3/2014 | Kowalski et al. |
| 2015/0314445 A1 | 11/2015 | Naitou et al. |
| 2016/0016315 A1 | 1/2016 | Kuffner, Jr. et al. |
| 2016/0089790 A1 | 3/2016 | Wang et al. |
| 2016/0207199 A1 | 7/2016 | Kuffner, Jr. et al. |
| 2017/0043484 A1 | 2/2017 | Kuffner et al. |
| 2018/0243897 A1 | 8/2018 | Hashimoto et al. |

FOREIGN PATENT DOCUMENTS

| | | | |
|---|---|---|---|
| CN | 105710889 | A | 6/2016 |
| EP | 0540753 | A1 | 5/1993 |
| EP | 3342541 | A1 | 7/2018 |
| JP | H03238297 | A | 10/1991 |
| JP | H04275887 | A | 10/1992 |
| JP | H04344505 | A | 12/1992 |
| JP | H05341834 | A | 12/1993 |
| JP | H10177409 | A | 6/1998 |
| JP | 2004017256 | A | 1/2004 |
| JP | 2004243427 | A | 9/2004 |
| JP | 2013071231 | A | 4/2013 |
| JP | 2013071239 | A | 4/2013 |
| JP | 2013528121 | A | 7/2013 |
| JP | 2014050950 | A | 3/2014 |
| JP | 2015051065 | A | 3/2015 |
| JP | 2015100677 | A | 6/2015 |
| JP | 5820013 | B1 | 11/2015 |
| JP | 2016064474 | A | 4/2016 |
| JP | 2016120561 | A | 7/2016 |
| JP | 2017523054 | A | 8/2017 |
| WO | 2016010614 | A1 | 1/2016 |
| WO | 2017033351 | A1 | 3/2017 |

OTHER PUBLICATIONS

Japanese Search Report by Registered Searching Authority received with Japanese Office Action dated Jul. 2, 2019, for Japanese Patent Application No. 2017-183130.

Decision to Grant a Patent dated Sep. 17, 2019, for Japanese Patent Application No. 2017-183130.

Chinese Office Action dated Dec. 17, 2019, for Chinese Patent Application No. 201811071294.1.

* cited by examiner

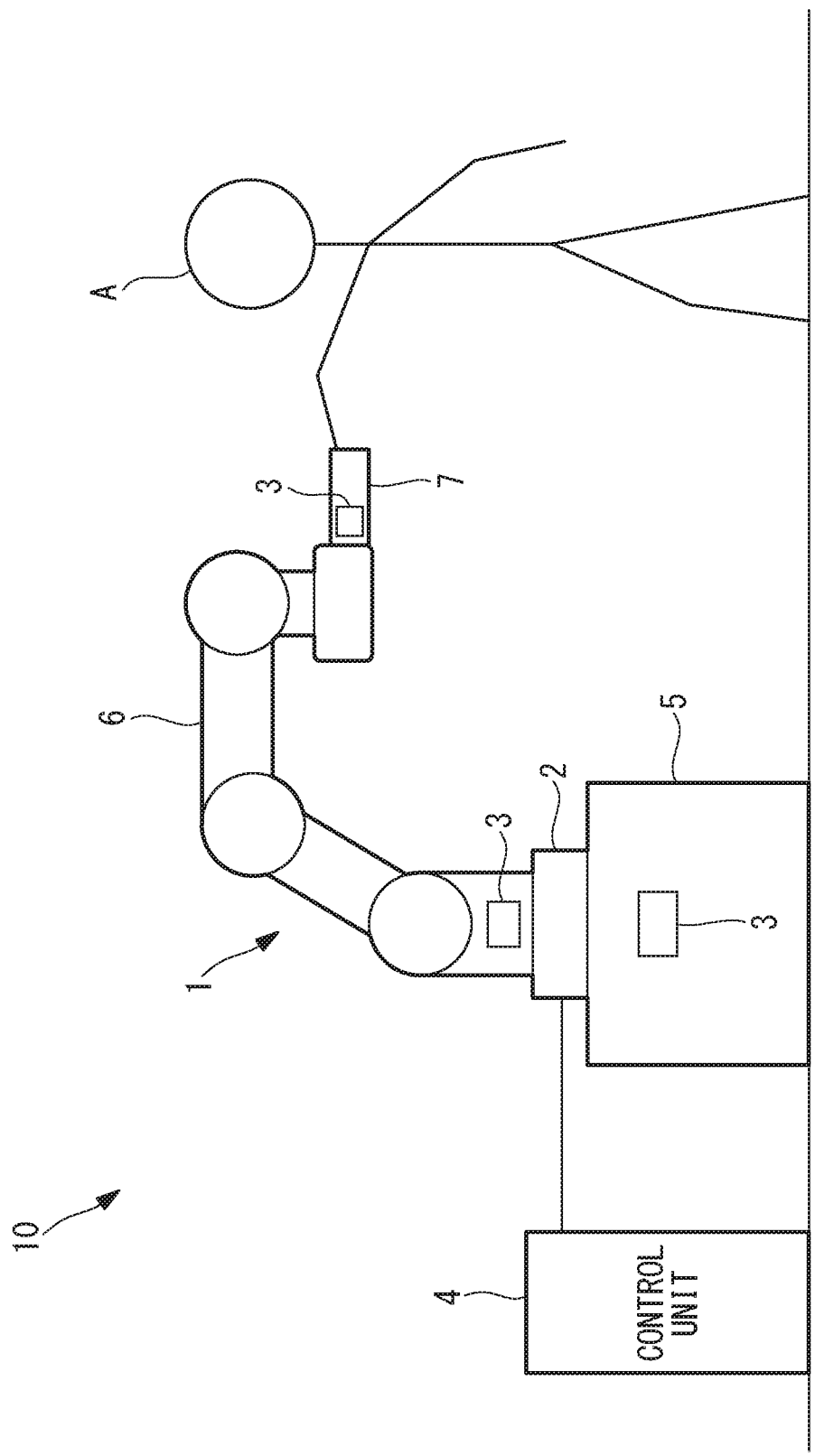

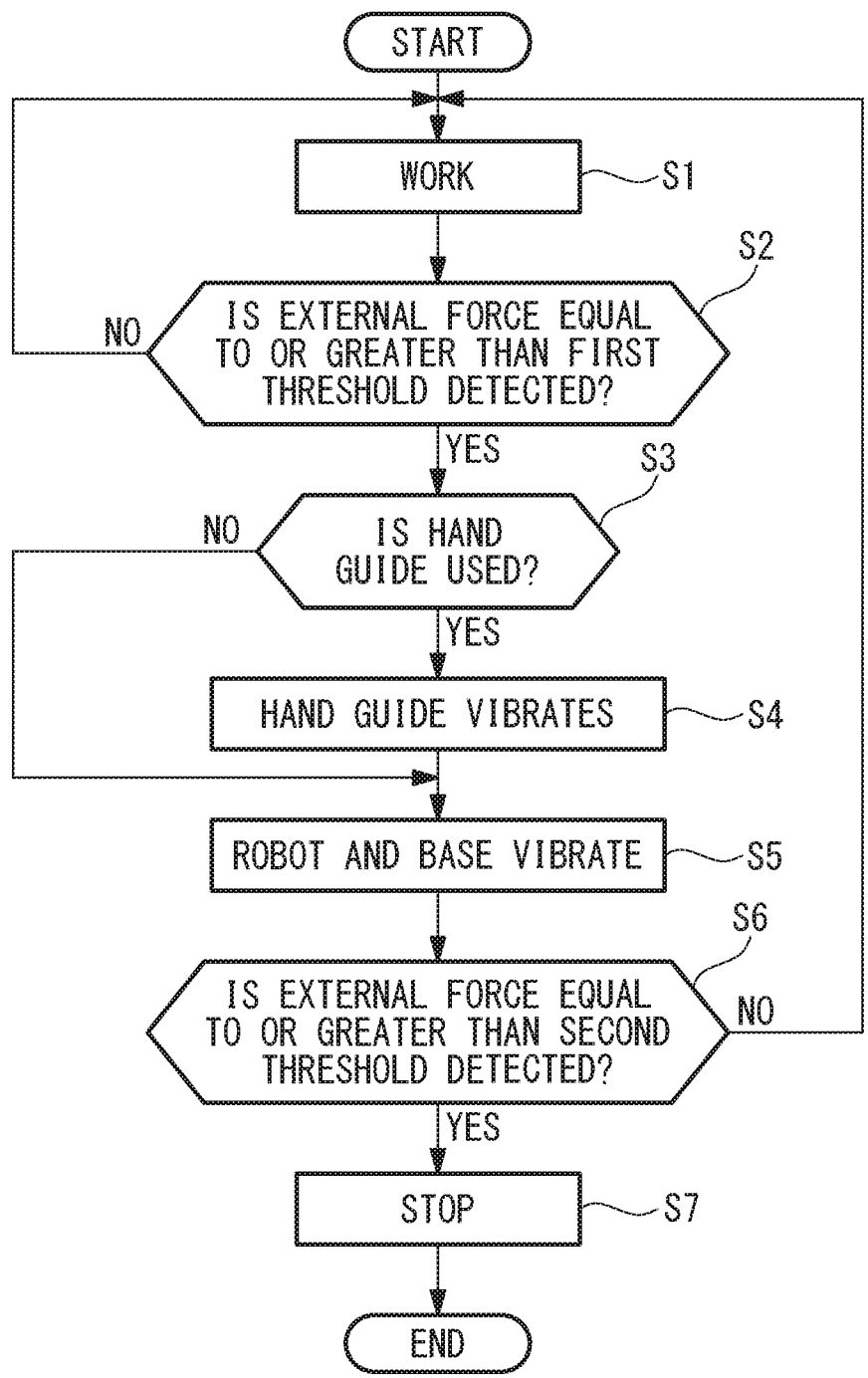

ROBOT SYSTEM

CROSS-REFERENCED TO RELATED APPLICATIONS

This application is based on and claims priority to Japanese Patent Application No. 2017-183130, filed on Sep. 25, 2017, the entire content of which is incorporated herein by reference.

FIELD OF THE INVENTION

The present invention relates to a robot system.

BACKGROUND OF THE INVENTION

In the related art, there is a known robot system in which, in order to prevent an excessive external force from acting on a robot, the magnitude of an external force acting on the robot is detected by a force sensor, and the robot is controlled on the basis of the detected magnitude of the external force (for example, see Japanese Unexamined Patent Application, Publication No. 2016-64474 and Japanese Unexamined Patent Application, Publication No. Hei 04-344505).

The robot system disclosed in Japanese Unexamined Patent Application, Publication No. 2016-64474 is a cooperative robot system working with a human in a common workspace, detects contact of a robot with the human or a surrounding object by using a force sensor, and stops the robot when the magnitude of a detected external force exceeds a predetermined threshold.

The robot system disclosed in Japanese Unexamined Patent Application, Publication No. Hei 04-344505 is a direct-teaching robot system in which a hand of a robot is directly operated by a human, detects a force applied by the human to the hand of the robot by using a force sensor, and stops the robot or issues a warning when the magnitude of the detected external force exceeds a predetermined threshold.

SUMMARY OF THE INVENTION

The present invention provides the following solutions.

One aspect of the present invention is directed to a robot system including: a robot that is movable according to an external force applied thereto by a worker; a force detecting unit that is provided in the robot and that detects the magnitude of an external force acting on the robot; a warning part that vibrates the robot when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit.

Another aspect of the present invention is directed to a robot that is movable according to an external force applied thereto by a worker; a force detecting unit that is provided in the robot and that detects the magnitude and the direction of an external force acting on the robot; a warning part that issues a warning when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit, wherein the warning part issues a different warning depending on the direction of the external force detected by the force detecting unit.

BRIEF DESCRIPTION OF THE DRAWINGS

FIG. 1 is a view showing the overall configuration of a robot system according to one embodiment of the present invention.

FIG. 2 is a flowchart showing the operation of the robot system shown in FIG. 1.

DESCRIPTION OF EMBODIMENTS OF THE INVENTION

A robot system 10 according to one embodiment of the present invention will be described below with reference to the drawings.

The robot system 10 of this embodiment is a cooperative robot system in which a single worker A and a single robot 1 work together, and, as shown in FIG. 1, is provided with: the cooperative robot 1; a force detecting unit 2 that is provided in the robot 1 and that detects an external force acting on the robot 1; vibration units 3 that are provided in the robot 1 and that produce vibrations; and a control unit (warning part, stop part) 4 that controls the robot 1 and the vibration units 3 on the basis of the magnitude of an external force detected by the force detecting unit 2. Reference sign 5 denotes a base on which the robot 1 is placed.

The robot 1 is a 6-axis articulated robot and is provided with an articulated arm 6 and a hand guide 7 that is detachably attached to a distal end portion of the arm 6. The robot 1 may be a robot having another structure. A tool for machining a workpiece or an end effector, such as a hand, for grasping a workpiece is attached to the distal end portion of the arm 6.

The robot 1 can be moved according to an external force applied to the arm 6. For example, in order to convey a workpiece grasped by the hand in cooperation with the robot 1, or in order to perform direct teaching in which the movement of the distal end portion of the arm 6 is directly taught, the worker A grasps, with his/her hand, the hand guide 7, which is attached to the distal end portion of the arm 6, and applies a force to the hand guide 7, thereby making it possible to move the distal end portion of the arm 6 in the direction of the force. Furthermore, in order to retreat the arm 6, the worker A directly pushes the arm 6 with his/her hand, thereby making it possible to move the arm 6 in the direction in which the arm 6 is pushed. At this time, on the basis of the magnitude and the direction of a force applied by the worker A to the distal end portion of the arm 6, which are detected by the force detecting unit 2, the control unit 4 may control motors at the respective joints of the arm 6 so as to assist in the movement of the arm 6 in the direction of the detected external force.

The force detecting unit 2 is, for example, a 6-axis force sensor that is provided at a base section of the robot 1 and detects the magnitudes of forces in three-axis directions perpendicular to each other and the moments about the three axes. The force detecting unit 2 may be a force sensor that is provided at each axis of the robot 1. The force detecting unit 2 sends information about the magnitude and the direction of the detected external force to the control unit 4. The force detecting unit 2 may send, together with the information about the magnitude and the direction of the external force, information about the range to which the external force has been applied, to the control unit 4.

The vibration units 3 are vibration motors, for example, and are provided in at least some parts of the robot 1. In the example shown in FIG. 1, the vibration units 3 are respectively provided on the arm 6, the hand guide 7, and the base 5.

Force detected by the force detecting unit 2 includes, in addition to an external force applied by the worker A to the arm 6 and the hand guide 7, the force of gravity applied to the arm 6 and the force of gravity applied to an object attached to the distal end portion of the arm 6, such as the tool, the hand, or the hand guide 7, and further includes, when the hand grasps a workpiece, the force of gravity applied to the workpiece. Furthermore, when the arm 6 is being moved, inertial forces acting on the arm 6, the object attached to the arm 6, and the workpiece are also included in the force detected by the force detecting unit 2.

In consideration of the above-described forces of gravity and inertial forces applied to the robot 1, the control unit 4 calculates, from the magnitude of a force detected by the force detecting unit 2, the magnitude of a net external force applied by the worker A to the arm 6 and the hand guide 7. The magnitude of a net external force can be calculated by the method described in the Publication of Japanese Patent No. 5820013, for example.

When an external force having a magnitude that is equal to or greater than a first predetermined threshold is detected by the force detecting unit 2, the control unit 4 causes the vibration units 3 to intermittently vibrate. Furthermore, when an external force that is equal to or greater than a second predetermined threshold is detected by the force detecting unit 2, the control unit 4 stops the robot 1. The second threshold is 65N, for example, and the first threshold has a value less than the second threshold. When an external force detected by the force detecting unit 2 has become less than the first threshold, or when the external force has become equal to or greater than the second threshold, thus putting the robot 1 into a stopped state, the control unit 4 causes the vibration units 3 to stop producing vibrations.

Next, the operation of the thus-configured robot system 10 will be described with reference to FIG. 2.

According to the robot system 10 of this embodiment, during actuation of the robot 1 (Step S1), when the worker A operates the hand guide 7 or pushes the arm 6, and thus an external force acts on the robot 1, the force detecting unit 2 detects the magnitude of the external force (Step S2).

If the detected magnitude of the external force is equal to or greater than the first threshold (YES in Step S2), the control unit 4 actuates the vibration units 3, thus vibrating the robot 1 and the base 5, on which the robot 1 is placed (Step S5). If the hand guide 7 is attached to the distal end portion of the arm 6, the hand guide 7 is also vibrated (YES in Step S3, Step S4). While an external force equal to or greater than the first threshold is applied to the robot 1, the vibration units 3 are intermittently actuated, thus keeping intermittently vibrating the robot 1. If a force applied by the worker A to the robot 1 is reduced to less than the first threshold, the vibrations of the robot 1 and the base 5 are stopped.

If the force applied by the worker A to the robot 1 is increased to even greater than the first threshold, and the detected magnitude of the external force has become equal to or greater than the second threshold (YES in Step S6), the control unit 4 stops the robot 1 (Step S7). At this time, the vibration units 3 are also stopped, thus stopping the vibrations of the robot 1 and the base 5, as well.

In this way, according to this embodiment, before an excessive external force equal to or greater than the second threshold is applied to the robot 1, the worker A is informed that the external force being applied to the robot 1 is approaching the second threshold, through vibration of the robot 1. In response to the vibration of the robot 1, the worker A weakens the force to be applied to the robot 1, thereby making it possible to prevent the external force from reaching the second threshold. Specifically, there is an advantage in that, while preventing an excessive external force from being applied to the robot 1, interruption of the work due to stoppage of the robot 1 is prevented, thereby making it possible to improve the work efficiency.

Furthermore, even when the surrounding environment is noisy, and, whichever direction the worker A is looking in, the vibration of the robot 1 is reliably transferred to the hand of the worker A who directly operates the robot 1. Therefore, there is an advantage in that it is possible to reliably allow the worker A to recognize that the magnitude of the external force is equal to or greater than the first threshold.

In this embodiment, the control unit 4 may cause a mobile device carried by the worker A to vibrate, in addition to the vibration units 3, which are provided on the robot 1 and the base 5.

In this embodiment, when an external force having a magnitude equal to or greater than the first threshold is detected by the force detecting unit 2, the control unit 4 may change, in a stepwise or continuous manner, the magnitude, frequency, time interval, or the like of vibrations produced by the vibration units 3 according to the magnitude of the external force. For example, the control unit 4 may control the vibration units 3 such that the magnitude of the vibrations is increased as an external force becomes larger or such that the time interval of the vibrations is reduced as an external force becomes larger.

By doing so, the worker A can recognize a specific magnitude of a force applied to the arm 6 or the hand guide 7, on the basis of the magnitude, frequency, time interval, or the like of the vibrations.

In this embodiment, the force detecting unit 2 may detect the direction of an external force in addition of the magnitude of the external force, and the control unit 4 may make the magnitude, period, time interval, or the like of vibrations produced by the vibration units 3 different depending on the direction of the external force.

By doing so, the worker A can recognize the direction of an external force that has become equal to or greater than the first threshold, on the basis of the magnitude, frequency, time interval, or the like of the vibrations, and can more appropriately adjust the force to be applied to the arm 6 or the hand guide 7.

In this embodiment, the force detecting unit 2 may detect an external force applied to the robot 1, on the basis of a change in current value of the motor provided on each axis of the arm 6.

If the arm 6 or the hand guide 7 collides with a surrounding object while the arm 6 is being moved, the current values of the motors rapidly decrease. Similarly, if an external force in the opposite direction from the moving direction of the arm 6 is applied by the worker A to the arm 6, output values of the motors also decrease; however, the decreases in the output values of the motor at this time are slower than those in a case of collision. In this way, if an external force acting against the movement of the arm 6 is applied to the arm 6, the current values of the motors decrease at a larger decrease rate as the external force becomes larger; thus, it is possible to estimate the magnitude of the external force on the basis of the decreases in the current values of the motors.

In this case, for example, the control unit 4 causes the vibration units 3 to vibrate when the output values of the motors decrease at a rate of decrease that is equal to or greater than a first predetermined value, and stops the robot 1 when the output values of the motors decrease at a rate of decrease that is equal to or greater than a second predetermined value that is greater than the first predetermined value. By doing so, before the robot 1 is stopped, the worker A can recognize that the worker A is applying a large force in the opposite direction from the moving direction of the arm 6, on the basis of the vibrations of the robot 1.

In this embodiment, although the worker A is informed that the magnitude of the external force has become equal to or greater than the first threshold, through vibrations of the robot 1, it is also possible to inform the worker A by part of an auditory or visual warning (for example, a sound or display).

In this case, the control unit 4 may make the warning different depending on the direction of an external force detected by the force detecting unit 2. For example, in a case in which the robot 1 and the worker A cooperatively convey a workpiece grasped by the hand, the type of a warning (vibration, sound, or display) can be made different among the direction along a conveying direction and different directions from the conveying direction. By doing so, the worker A can recognize the direction of an external force that has become equal to or greater than the first threshold on the basis of the warning and can appropriately adjust the force to be applied to the arm 6 or the hand guide 7.

As a result, the above-described embodiment leads to the following aspects.

One aspect of the present invention is directed to a robot system including: a robot that is movable according to an external force applied thereto by a worker; a force detecting unit that is provided in the robot and that detects the magnitude of an external force acting on the robot; a warning part that vibrates the robot when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit.

According to this aspect, while the worker applies a force to the robot to operate the robot, the magnitude of an external force acting on the robot is detected by the force detecting unit, and, when the magnitude of the external force has become equal to or greater than the first predetermined threshold, the warning part vibrates the robot. Then, when the external force acting on the robot is further increased, and the magnitude of the external force has become equal to or greater than the second predetermined threshold, the stop part stops the robot.

In this way, before the external force reaches the second threshold, the worker is informed that the magnitude of the external force is approaching the second threshold, through the vibration of the robot; thus, the worker can take appropriate action, such as weakening of the force applied to the robot, before the robot is stopped by the stop part. Accordingly, the work efficiency can be improved by preventing interruption of the work while preventing an excessive external force from being applied to the robot. Furthermore, even when the surrounding environment is noisy, and, even whichever direction the worker is looking in, the vibration of the robot is reliably transferred to the hand of the worker who is operating the robot; therefore, it is possible to reliably allow the worker to recognize that the magnitude of the external force has reached the first threshold.

In the above-described aspect, the force detecting unit may detect the direction of the external force; and the warning part may make the vibration different depending on the direction of the external force.

By doing so, it is possible to allow the worker to recognize the direction of an external force having a magnitude equal to or greater than the first threshold, through the difference in the vibration.

In the above-described aspect, the warning part may change the vibration according to the magnitude of the external force.

By doing so, it is possible to allow the worker to recognize the magnitude of an external force acting on the robot, through a change in the vibration.

According to another aspect, the present invention is directed to a robot that is movable according to an external force applied thereto by a worker; a force detecting unit that is provided in the robot and that detects the magnitude and the direction of an external force acting on the robot; a warning part that issues a warning when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit, wherein the warning part issues a different warning depending on the direction of the external force detected by the force detecting unit.

According to this aspect, while the worker applies a force to the robot to operate the robot, the magnitude of an external force acting on the robot is detected by the force detecting unit, and, when the magnitude of the external force has become equal to or greater than the first predetermined threshold, the warning part issues a warning. Then, when the external force acting on the robot is further increased, and the magnitude of the external force has become equal to or greater than the second predetermined threshold, the stop part stops the robot.

In this way, before the external force reaches the second threshold, the worker is informed that the magnitude of the external force is approaching the second threshold, through the warning; thus, the worker can take appropriate action, such as weakening of the force applied to the robot, before the robot is stopped by the stop part. Accordingly, the work efficiency can be improved by preventing interruption of the work while preventing an excessive external force from being applied to the robot. Furthermore, because the warning differs depending on the direction of the external force, the worker can recognize the direction of an external force that is being increased.

According to the present invention, an advantageous effect is afforded in that it is possible to improve the work efficiency by preventing interruption of the work while preventing an excessive external force from being applied to the robot.

The invention claimed is:
1. A robot system comprising:
a robot that is movable according to an external force applied thereto by a worker;
a force detecting unit that is provided in the robot and that detects the magnitude of an external force acting on the robot;

a warning part that vibrates the robot when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit, wherein the warning part changes the vibration according to the magnitude of the external force.

2. The robot system according to claim 1, wherein the force detecting unit detects the direction of the external force; and the warning part makes the vibration different depending on the direction of the external force.

3. A robot system comprising:

a robot that is movable according to an external force applied thereto by a worker;

a force detecting unit that is provided in the robot and that detects the magnitude and the direction of an external force acting on the robot;

a warning part that issues a warning when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit, wherein the warning part issues a different warning depending on the direction of the external force detected by the force detecting unit.

4. A robot system comprising:

a robot that is movable according to an external force applied thereto by a worker;

a force detecting unit that is provided in the robot and that detects the magnitude of an external force acting on the robot;

a vibration part that is provided in at least one of an arm of the robot and a base on which the robot is placed, and that produces vibration;

a warning part that generates vibration in vibration part the robot when an external force having a magnitude equal to or greater than a first predetermined threshold is detected by the force detecting unit; and a stop part that stops the robot when an external force having a magnitude equal to or greater than a second predetermined threshold that is greater than the first predetermined threshold is detected by the force detecting unit.

5. The robot system according to claim 4, wherein the force detecting unit detects the direction of the external force; and the warning part makes the vibration different depending on the direction of the external force.

6. The robot system according to claim 4, wherein the warning part changes the vibration according to the magnitude of the external force.

* * * * *